United States Patent [19]

Mikkelsen

[11] 3,825,209

[45] July 23, 1974

[54] TAPE RECORDER DRIVING MECHANISM

[75] Inventor: Eric Mikkelsen, Struer, Denmark

[73] Assignee: Bang and Olufsen A/S, Struer, Denmark

[22] Filed: Nov. 27, 1972

[21] Appl. No.: 309,917

[30] Foreign Application Priority Data

Nov. 26, 1971 Denmark ....................... 5795/71

[52] U.S. Cl. ................ 242/201, 74/242.7, 274/11 D

[51] Int. Cl. ......................... B11b 15/32, G03b 1/04

[58] Field of Search ............................ 242/201-204; 274/4 D, 11 D; 74/242-242.7

[56] References Cited

UNITED STATES PATENTS

| | | | |
|---|---|---|---|
| 2,948,485 | 8/1960 | Cotte | 242/201 |
| 3,555,917 | 1/1971 | Louzil et al. | 74/242.7 |
| 3,610,553 | 10/1971 | Matsuyama | 242/201 |

*Primary Examiner*—Leonard D. Christian
*Attorney, Agent, or Firm*—Craig & Antonelli

[57] ABSTRACT

A tape recorder drive mechanism comprising a motor driven capstan and motor driven spool carriers operable to selectively cause the tape to be wound up and unwound, respectively, with low speed by normal operation and with high speed by fast forward or rearward winding, characterised by the combination that the capstan is driven by a separate motor and that for driving the spool carriers there is used a single winding motor operable to selectively drive either of said spool carriers with a high or a low moment of rotation depending of the operation condition, whereas said winding motor is electrically reversable and is connected with automatic coupling means operable to establish driving connection between the motor and one or the other spool carrier in accordance with the direction of rotation of the motor, said driving means being established through substantially nonslipping transmission means, said winding motor being adapted to be fed with a higher or lower voltage, respectively, for producing said high or low moment of rotation.

12 Claims, 2 Drawing Figures

TAPE RECORDER DRIVING MECHANISM

Figures 1, 2:
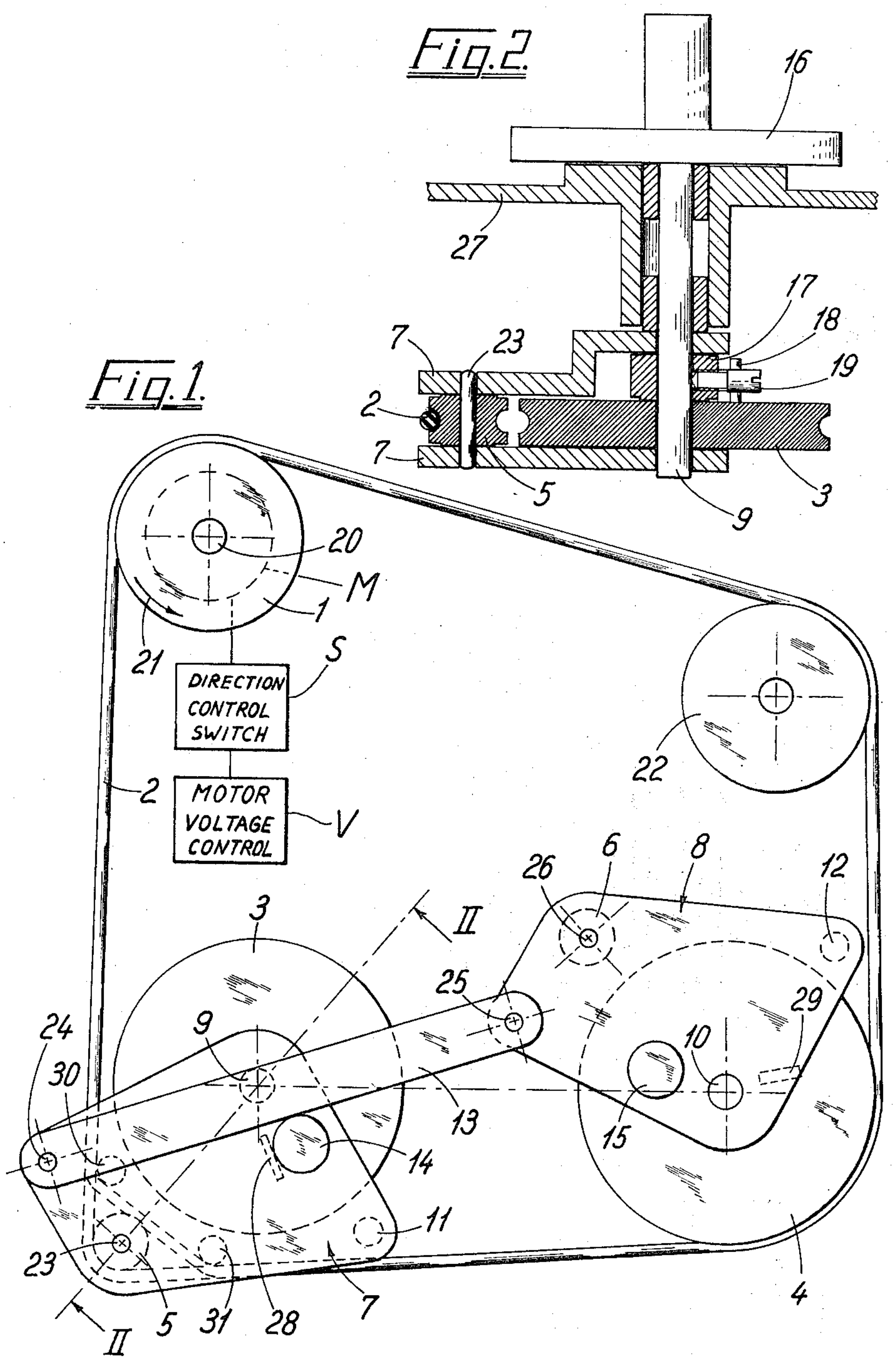

The present invention relates to magnetic tape recorders and more particularly to the drive mechanism used in such recorders for moving the tape under various conditions occurring during the operation of the recorder. Since magnetic tape is usually supplied wound on to a spool, it is the primary function of the tape recorder mechanism to unwind the tape spool, to guide the tape towards a sound channel in which an erase head and a recording and playback head are positioned, to guide the tape towards the take-up spool to cause said spool to continuously wind up the tape. In addition the mechanism must be able to perform fast forward winding and rewinding of the tape.

During normal recording and playback the tape must be fed at a constant speed and the spool carriers must be affected by moments which allow winding and unwinding of the tape while maintaining a suitable tape tension. In this operating condition the tape speed is determined by a capstan shaft against which the tape is pressed by a rubber or neoprene pressure roller.

Some tape recorders are equipped with three motors for driving the capstan and the two spool carriers separately, in which case the moments applied to the carriers can be varied by changing the voltage applied to the associated motors. Switching between the two directions of winding can be made by pure electrical switching of the motors so that no mechanical control operations are required. The three motors cause such tape recorders to be rather expensive and heavy.

Most tape recorders, therefore, are provided with only one motor for driving both the capstan and the spool carriers. In this case the motor is coupled to the carriers through belts or intermediate wheels in such a manner that during fast winding or rewinding it can drive the take-up spool at an appropriate speed and during recording or playback it drives the take-up spool through a slipping clutch. Such arrangements imply troublesome mechanical switching operations and the necessary slipping clutch is liable to change in the course of time. Furthermore, the motor driving the capstan during normal recording and playback operation is loaded by the winding moment which often is a contributory cause of uneven running.

It is the purpose of the present invention to provide a tape recorder drive mechanism having less than three motors and nevertheless enabling the various directions and speeds of operation to be obtained by purely electrical switching functions and without the use of a slipping clutch means.

According to the invention this advantageous result is obtained by using a separate motor for driving the spool carriers said motor being reversible and coupled to the carriers through an automatic coupling machanism which is responsive to the direction of rotation of the motor and arranged to drive a different one of the carriers for each of the two directions. Changes of the carrier moments are made by controlling the motor voltage.

The various aspects and features of the invention will be better understood from the following detailed specification with reference to the drawing in which, by way of example, FIG. 1 schematically shows a preferred embodiment of a drive mechanism according to the invention, and FIG. 2 is a vertical section taken along the line II—II in FIG. 1.

In FIG. 1 a drive pulley 1 is shown fixed to a shaft 20 of a motor M. With the motor M runnng counterclockwise as indicated by an arrow 21 the pulley 1 drives through a belt 2, passing over a guide pulley 22 and a belt lifting pulley 5, a first spool pulley 4 fixed to a shaft 10 on which a spool carrier corresponding to that shown by 16 in FIG. 2 is mounted. The lifting pulley 5 serves to keep the belt disengaged from a second spool pulley 3 so that the latter is freely rotatable with respect to the belt 2. The pulley 3 is mounted on a shaft 9 carrying a second spool carrier 16, FIG. 2. The lifting pulley 5 is rotatably mounted on a pin 23 positioned on a lifting member 7 which is pivotally mounted on the shaft 9. The angular position of the member 7 is determined by the abutment of an interconnecting link 13 against a stop pin 14 fixed, in a manner not shown, to the chassis 27 (FIG. 2) of the tape recorder drive machanism. The shafts 9 and 10 are rotatably secured to the chassis 27.

If the direction of rotation of the motor pulley 1 is reversed, for example, by electrical switching S, the belt 2 will carry along the lifting pulley 5, no stop members being provided to stop pivotal movement in that direction. After some few degrees of rotation of the member 7 a capture pin 11 fixed to said member and extending at right angles thereto will engage with the belt 2 and thereby cause the member 7 to be rotated through approximately half a revolution till both the lifting pulley 5 and the capture pin 11 are totally disengaged from the belt 2. The belt is now in engagement with and drives the spool pulley 3.

As will appear from FIG. 1 the lifting member 7 is linked to another similar lifting member 8 rotatably mounted on the shaft 10 carrying the first spool pulley 4, by means of the link 13 which is connected to the two lifting members by pivot pins 24 and 25, respectively. The lifting member 8 carries a lifting pulley 6 rotatably mounted on a pin 26, a capture pin 12 and a stop pin 15 corresponding to the elements 5, 23, 11 and 14, respectively, on the lifting member 7.

When the lifting member 7 rotates as described above, the link 13 will push the other lifting member 8 which will be pivoted about the shaft 10. After having been swung through a small angle the capture pin 12 will engage with the belt 2 and thus turn the member 8 around till the lifting pulley 6 has lifted the belt free of the spool pulley 4. The member 8 is stopped in this position by abutment of the link 13 against the stop pin 15. The capture pin 12 has now been disengaged from the belt, and the link 13 causes the lifting member 7 to be so positioned that also the capture pin 11 is disengaged from the belt, i.e. the two members 7 and 8 will assume inverted positions compared with those shown in FIG. 1.

In order to keep the lifting pulley 5 in the correct position the resultant of the belt forces affecting the pulley must pass the axis of rotation of the member 7 on the side of said axis on which the belt leaves the pulley 5. This means that during its movement into engagement the pulley 5 must pass slightly beyond the dead point in which the resultant of the belt forces passes through the pivot axis of the member 7.

Immediately after the direction of rotation of the motor M has been changed during reversal, as described above, and before the lifting members 7 and 8 have been pivoted to their new positions, a situation will occur in which the pulley 4 is driven by the belt without the pulley 3 being driven. If the pulleys 3 and 4 were fixedly mounted on the shafts 9 and 10, respectively, and tape reels were placed on the carriers 16, the wind-off spool would start winding off tape, before the wind-on spool would begin to wind on tape, so that a loop of tape would be formed during reversal. In order to avoid this undesirable effect the pulleys 3 and 4 are coupled to the shafts 9 and 10 respectively through a dog coupling in such a manner that they are allowed to rotate freely through almost one revolution. As shown in FIG. 2 the dog coupling comprise a dog sleeve 17, which is fixed to the shaft 9 by means of a set screw 19, the outer end of which projects into the path of movement of a dog pin 18 fixed to the pulley 3 and extending axially with respect thereto. When the pulley rotates, it will carry along the shaft 9, when the dog pin 18 engages with the set screw 19. If the pulley 3 is rotated in the opposite direction, it will rotate almost one revolution before the shaft 9 is carried along and the switch-over has been effected. Such a dog coupling is provided at both spool pulleys 3 and 4.

By the invention is obtained that the four operations constituted by recording and playback in both directions and winding in both directions can be effected merely by electrical switching of a motor. A more even running of the capstan shaft is obtained, because its driving motor is not loaded by the take-up moment. As compared with a tape recorder having separate spool motors one motor is saved. The motor used may be an asynchronous motor or a direct current motor, the speed and moment of rotation of which can be controlled by employing conventional means V for varying the applied voltage.

According to another embodiment of the invention the link 13 can be omitted. In this case a suitable friction contact must be established between each of the lifting members 7 and 8 and the spool pulleys 3 and 4 respectively. The friction will rotate the member 8 with the lifting pulley 6 to be engaged, till the capture pin 12 engages with the belt, such as the friction will keep the member carrying the non-engaged lifting pulley in such a position that the associated capture pin will be disengaged from the belt. In the absence of the link 13 the members 7 and 8 should, of course, be provided with abutment means such as shown at 28 and 29, respectively, for engaging the stop pins 14 and 15, respectively.

According to still another embodiment of the invention the lifting members 7 and 8 may each be provided with more than one lifting pulley, e.g. with two pulleys 30 and 31 as shown in dotted lines in FIG. 1, whereby the extent of the lifting movement of the belt 2 with relation to the spool pulleys 3 and 4 can be reduced so as to enable a reduction of the driction between the capture pins 11 and 12 and the belt 2.

Other modifications of the drive mechanism are possible without departing from the scope of the invention as defined by the attached claims. Thus, the driving connection between the motor and the spool carriers may be established through driving pulleys and discs, without the use of a belt, as well known per se. The change of the coupling means should not necessarily take place in response to the actual rotation of the motor, since it may be effected automatically by electromagnetic means controlled by the motor power supply; to this end it will be possible e.g. to arrange the clutch means in such a manner that by the action of a spring they assume their active position in driving connection with the normal winding up spool carrier, while they may be shifted into operative connection with the other spool carrier by means of a solenoid energised via the switch serving to reverse the motor and thereby operable to overcome the said spring force. The clutch means may even be arranged in each of the shaft connections between the spool carriers and the associated pulleys thereof, whereby there may be a permanent driving connection between the motor and the spool carrier pulleys.

What is claimed is:

1. A tape recorder drive mechanism comprising in combination a. a chassis, b. a first and a second shaft rotatably mounted in said chassis each of said shafts carrying a spool carrier, c. a reversable motor carried by said chassis, d. substantially non-slipping coupling means for drivingly connecting said motor to either one of said shafts according to the direction of rotation of said motor, the non-driven shaft being allowed to rotate substantially freely, and e. electrical means for changing the torque produced by the motor.

2. A tape recorder drive mechanism according to claim 1 wherein said coupling means comprises a. a pulley fixed to the motor shaft, b. a pair of pulleys mounted on said first shaft and said second shaft respectively, c. a belt which is permanently engaged with said motor pulley, and d. an automatic coupling mechanism which is arranged to cause said belt to be engaged with the pulley on said first shaft or with the pulley on said second shaft dependent on the direction of movement of said belt.

3. A tape recorder drive mechanism according to claim 2, wherein said coupling mechanism comprises a belt lifting member pivotally mounted adjacent each of the pulleys mounted on said first and second shaft, respectively, a belt lifting roller operatively connected with each belt lifting member, said belt lifting members being frictionally engaged with said belt in such a manner that during movement of said belt in one direction a respective belt lifting member is carried along with the belt to thereby interpose its respective belt lifting roller between said belt and said pulley, stop means for limiting the movement of each of said belt lifting members, said stop means defining an active position of said belt lifting members, movement of the belt in the opposite direction causing a respective belt lifting member to be carried along with the belt from said active position to thereby swing its respective belt lifting roller into an inactive position.

4. A tape recorder drive mechanism according to claim 3, wherein means are provided for coupling said two belt lifting members whereby movement of one belt lifting member from a first position to a second position causes the opposite movement of the other member.

5. A tape recorder drive mechanism according to claim 1, wherein means are provided for connecting each spool carrier with its respective pulley as to be freely rotatable with relation thereto through an angle of less than 360°, preferably about 330°.

6. A tape recorder drive mechanism according to claim 3, wherein means are rotatably mounted at said first and second shafts for supporting said belt lifting members and wherein means are provided for connecting said supporting means of each of said belt lifting members.

7. A tape recorder drive mechanism according to claim 6, wherein said connecting means is a lever the respective ends of which are pivotally mounted on said supporting means.

8. A tape recorder drive mechanism according to claim 3, wherein a means is provided for connecting said two belt lifting members and wherein said stop means cooperates with said connecting means to define said active position of a respective belt lifting member.

9. A tape recorder drive mechanism according to claim 8, wherein said connecting means is a lever the respective ends of which are pivotally mounted on said supporting means.

10. A tape recorder drive mechanism according to claim 9, wherein said stop means are provided of each of said supporting means.

11. A tape recorder drive mechanism according to claim 5, wherein said means for connecting each spool carrier consists of a dog coupling.

12. A tape recorder drive mechanism according to claim 11, wherein said dog coupling includes a sleeve portion disposed on said first and second shafts, means for fixing said sleeve portions on its respective shaft, and a dog pin fixed to each of said pulleys cooperating with said last mentioned means.

* * * * *